United States Patent
Casto et al.

(10) Patent No.: US 9,161,184 B2
(45) Date of Patent: Oct. 13, 2015

(54) ALPHANUMERIC ADDRESS MAPPING FOR NON-HOMOGENEOUS SHORT MESSAGE NETWORKS

(75) Inventors: Paul Casto, Bowie, MD (US); Lewis Tuttle, Stevensville, MD (US); Donghong Gao, Clarksville, MD (US)

(73) Assignee: TeleCommunications Systems, Inc., Annapolis, MD (US)

( * ) Notice: Subject to any disclaimer, the term of this patent is extended or adjusted under 35 U.S.C. 154(b) by 513 days.

(21) Appl. No.: 13/374,356

(22) Filed: Dec. 23, 2011

(65) Prior Publication Data

US 2012/0220320 A1 Aug. 30, 2012

Related U.S. Application Data

(60) Provisional application No. 61/457,084, filed on Dec. 23, 2010.

(51) Int. Cl.

| H04W 4/14 | (2009.01) |
|---|---|
| H04W 4/12 | (2009.01) |
| H04L 29/12 | (2006.01) |
| H04L 12/58 | (2006.01) |
| H04M 15/00 | (2006.01) |
| H04M 17/02 | (2006.01) |
| H04W 24/00 | (2009.01) |
| H04W 84/06 | (2009.01) |

(52) U.S. Cl.
CPC ............... *H04W 4/12* (2013.01); *H04L 51/28* (2013.01); *H04L 61/106* (2013.01); *H04M 15/55* (2013.01); *H04M 17/02* (2013.01); *H04L 51/38* (2013.01); *H04M 2215/28* (2013.01)

(58) Field of Classification Search
CPC ....................................................... H04W 4/14
USPC .................. 455/466, 418, 415, 424, 425, 428
See application file for complete search history.

(56) References Cited

U.S. PATENT DOCUMENTS

| 6,052,710 A | 4/2000 | Saliba |
| 6,058,428 A | 5/2000 | Wang |

(Continued)

OTHER PUBLICATIONS

International Search Report received in PCTUS2011/00210 dated Jul. 27, 2012.

(Continued)

*Primary Examiner* — Muthuswamy Manoharan
(74) *Attorney, Agent, or Firm* — William H. Bollman

(57) ABSTRACT

Text messages with alphanumeric addresses are delivered to mobiles and external short message entities (ESMEs) which do not support alphanumeric addressing, providing meaningful fallback handling. Additionally, the invention enables delivery of SMPP messages from ESME or SMPP networks which can only originate numeric addresses, yet provide for mapping to alphanumeric addresses for delivery to the mobile. A two-way mapping is provided between alphanumeric addresses and SMS short-codes to enable delivery of text messages with alphanumeric addressing in networks which contain mobiles and/or ESME's that lack support of alphanumeric addressing. An ESME can send a text message using an alphanumeric origination address, without knowing which handsets support the capability, and which do not, or whether handsets are on CDMA, or GSM, or UMTS, or networks, or can continue to send using a numeric origination address. The SMSC provides conversions to alphanumeric addresses on behalf of the ESME and the mobile.

8 Claims, 8 Drawing Sheets

(56) References Cited

U.S. PATENT DOCUMENTS

| | | | |
|---|---|---|---|
| 6,128,653 A | 10/2000 | Del Val | |
| 6,139,177 A | 10/2000 | Venkatraman | |
| 6,459,904 B1 | 10/2002 | Lorello | |
| 6,564,249 B2 | 5/2003 | Shiigi | |
| 6,625,460 B1 | 9/2003 | Patil | |
| 6,665,489 B2 | 12/2003 | Collart | |
| 6,763,373 B2 | 7/2004 | Shiigi | |
| 6,801,781 B1 | 10/2004 | Provost | |
| 7,003,306 B2 * | 2/2006 | Henry-Labordere | 455/466 |
| 7,072,984 B1 | 7/2006 | Polonsky | |
| 7,243,152 B2 | 7/2007 | Guggisberg | |
| 7,269,431 B1 | 9/2007 | Gilbert | |
| 7,319,882 B2 | 1/2008 | Mendiola | |
| 7,761,105 B2 | 7/2010 | Harding | |
| 8,046,011 B2 * | 10/2011 | Smith et al. | 455/466 |
| 2001/0042107 A1 | 11/2001 | Palm | |
| 2002/0046253 A1 | 4/2002 | Uchida | |
| 2002/0077927 A1 | 6/2002 | Lasnier | |
| 2002/0126708 A1 | 9/2002 | Skog | |
| 2002/0198999 A1 | 12/2002 | Smith | |
| 2003/0028647 A1 | 2/2003 | Grosu | |
| 2003/0069975 A1 | 4/2003 | Abjanic | |
| 2003/0172121 A1 | 9/2003 | Evans | |
| 2003/0191805 A1 | 10/2003 | Seymour | |
| 2003/0200301 A1 | 10/2003 | Trzcinko | |
| 2003/0208558 A1 | 11/2003 | Venkatraman | |
| 2003/0217291 A1 | 11/2003 | Schramm-Apple | |
| 2003/0224809 A1 | 12/2003 | Savinen | |
| 2003/0224811 A1 | 12/2003 | Jain | |
| 2003/0234815 A1 | 12/2003 | Delany | |
| 2004/0002896 A1 | 1/2004 | Alanen | |
| 2004/0203614 A1 | 10/2004 | Qu | |
| 2004/0236710 A1 | 11/2004 | Clary | |
| 2005/0010694 A1 | 1/2005 | Ma | |
| 2005/0059418 A1 | 3/2005 | Northcutt | |
| 2006/0073810 A1 | 4/2006 | Pyhalammi | |
| 2007/0015501 A1 * | 1/2007 | Wilson | 455/424 |
| 2007/0047702 A1 | 3/2007 | Newell | |
| 2007/0060131 A1 | 3/2007 | Wilson | |
| 2008/0160954 A1 | 7/2008 | Agarwel | |
| 2008/0270558 A1 | 10/2008 | Ma | |
| 2008/0281923 A1 | 11/2008 | Barchi | |
| 2009/0075627 A1 | 3/2009 | Hwang | |
| 2009/0191902 A1 | 7/2009 | Osborne | |
| 2010/0009701 A1 | 1/2010 | Cai | |
| 2010/0093315 A1 | 4/2010 | Grosch | |
| 2011/0053618 A1 | 3/2011 | Lin | |
| 2011/0055076 A1 | 3/2011 | Trifiletti | |
| 2011/0102172 A1 | 5/2011 | Chiu | |
| 2011/0151852 A1 | 6/2011 | Olincy | |
| 2011/0151902 A1 | 6/2011 | Sweatman | |
| 2011/0207438 A1 | 8/2011 | Sanjeev | |
| 2012/0220284 A1 | 8/2012 | Tadayon | |
| 2013/0316747 A1 * | 11/2013 | Bychkov et al. | 455/466 |

OTHER PUBLICATIONS

International Preliminary Report on Patentability received in PCT/US2011/02004 dated Nov. 16, 2012.

International Search Report received in PCT/US2012/00086 dated Apr. 30, 2012.

International Search Report received in PCTUS2011/002004 dated Apr. 20, 2012.

International Search Report received in PCTUS2012/00086 dated Apr. 30, 2012.

* cited by examiner

ESME Numeric to Mobile Alphanumeric

Mobile Alphanumeric to ESME Numeric

ALPHANUMERIC ADDRESS MAPPING FOR NON-HOMOGENEOUS SHORT MESSAGE NETWORKS

This application claims priority from U.S. Provisional No. 61/457,084, entitled "ALPHANUMERIC ADDRESS MAPPING FOR NON-HOMOGENEOUS SHORT MESSAGE NETWORKS" to Paul CASTO, Lewis TUTTLE, and Donghong GAO, filed Dec. 23, 2010, the entirety of which is expressly incorporated herein by reference.

BACKGROUND OF THE INVENTION

1. Field of the Invention

This invention relates generally to telecommunications. More particularly, it relates to wireless based technologies.

2. Background of the Related Art

When a short message service center (SMSC) operates in a long term evolution (LTE)/CDMA (or GSM/CDMA, or UMTS/CDMA) dual mode network, the vast majority of GSM, UMTS and LTE mobiles support alphanumeric addressing where as many or most CDMA mobiles may not. This impacts the display of the originator of the message to the end-user of the mobile phone (or conversely the terminator, when the user is replying). Many corporations would like messages that they send to an end-user to appear with some form of corporate branding. E.g. ABXCorp would rather have the end user see a message from ABXCorp, rather than see that they have a message from 12345, and then have to figure out what those numbers represent.

A similar issue is also found in supporting external short message entities (ESMEs) from two different vendors. Some ESMEs support alphanumeric addressing while others do not.

Currently, if the mobile or ESME does not allow for message delivery with alphanumeric addresses encoded, the message to the mobile or the ESME may be discarded.

Alternatively, for messages destined to a Mobile, a generic numerical address may be substituted for the alphanumeric address, but a substituted generic numerical address is not meaningful to the Mobile end-user.

Many GSM/UMTS/LTE handsets support alphanumeric addresses. Some CDMA handsets may support alphanumeric (IA5) addresses. SMPP standard supports alphanumeric addresses, but many ESMEs/SMPP gateways have not fully implanted that portion of the standard. Thus, while end-points (some handsets and some ESMEs) may support alphanumeric addressing, the support for end-to-end alphanumeric addressing is not always complete.

ESMEs that are aware that a particular end-user handset has the alphanumeric capability could attempt delivery using that format, but that would require the ESME to maintain information about every phone number that it is sending to. Moreover, an ESME maintaining information about every phone number that it is sending to would be very susceptible to the user changing handset models.

Messages that are deleted due to protocol errors (e.g. handset cannot decode an address with alphanumeric characters) result in non-delivery to the subscriber. Messages that have had generic 'alphanumeric to generic' translation rules applied arrive at the handset without allowing the handset device to obtain the identity of the originator, thus also preventing the user device from responding.

SUMMARY OF THE INVENTION

In accordance with the principles of the present invention, a method of handling alphanumeric address mapping for a non-homogeneous short message network comprises receiving a message including an alphanumeric origination address, from an external short message entity (ESME), destined for a terminating mobile device. Mapping the alphanumeric origination address identifying the originating sender's address to a digit string identifying the originating sender's address prior to the first attempt to deliver the message to the terminating mobile device. The message is then routed to a terminating mobile device including numeric destination addressing.

A method of handling alphanumeric address mapping for a non-homogeneous short message network in accordance with another embodiment of the invention comprises receiving a message including an alphanumeric origination address identifying an originating sender from an external short message entity (ESME). The message is routed to a terminating mobile device including alphanumeric origination addressing. A failed delivery message relating to failure of the message is received. The alphanumeric origination address identifying the originating sender is mapped to a digit string that provides an alternative identification of the originating sender. The message is routed to the terminating mobile device including numeric destination addressing. This provides support for the use cases where the originating ESMEs (and intervening infrastructure) provides the capability to originate messages from alphanumeric addresses, but the receiving devices include a range of network types (LTE/CDMA/UMTS/GSM) and handset types, some of which do support receiving these messages, others of which can not.

Yet another embodiment of the invention discloses a method of handling alphanumeric address mapping for a non-homogeneous short message network. A message is received including a numeric origination address identifying the originating sender from an external short message entity (ESME). The numeric origination address identifying the originating sender is mapped to an alphanumeric string identifying the an alphanumeric address for the originating sender, prior to a first attempt to deliver the message to the terminating mobile device. The message is routed to a terminating mobile device including alphanumeric originating address. This provides support for the use cases where the originating ESMEs (or intervening infrastructure) lacks the capability to originate messages addressed from an alphanumeric address, yet some, or all of the handsets (and supporting infrastructure) has the capability to receive such messages. A further fallback to the first embodiment is also possible in this case.

Still another embodiment discloses a method of handling alphanumeric address mapping for a non-homogeneous short message network. A message is received including an alphanumeric destination address identifying a terminating external short message entity (ESME), from a mobile device. It is determined through configuration that the terminating external short message entity (ESME) requires numeric addressing. The alphanumeric destination address is converted to a digit address. The message addressed with the digit address is routed to the external short message entity (ESME). This provides support for the use cases where the originating handsets (and intervening infrastructure) provide the capability to originate messages addressed to an alphanumeric ESME address (including the case of 'reply to' alphanumeric addresses), but the ESME (or intervening infrastructure) lacks the capability to receive such messages.

BRIEF DESCRIPTION OF THE DRAWINGS

Features and advantages of the present invention become apparent to those skilled in the art from the following description with reference to the drawings.

DETAILED DESCRIPTION OF ILLUSTRATIVE EMBODIMENTS

Figure 1:
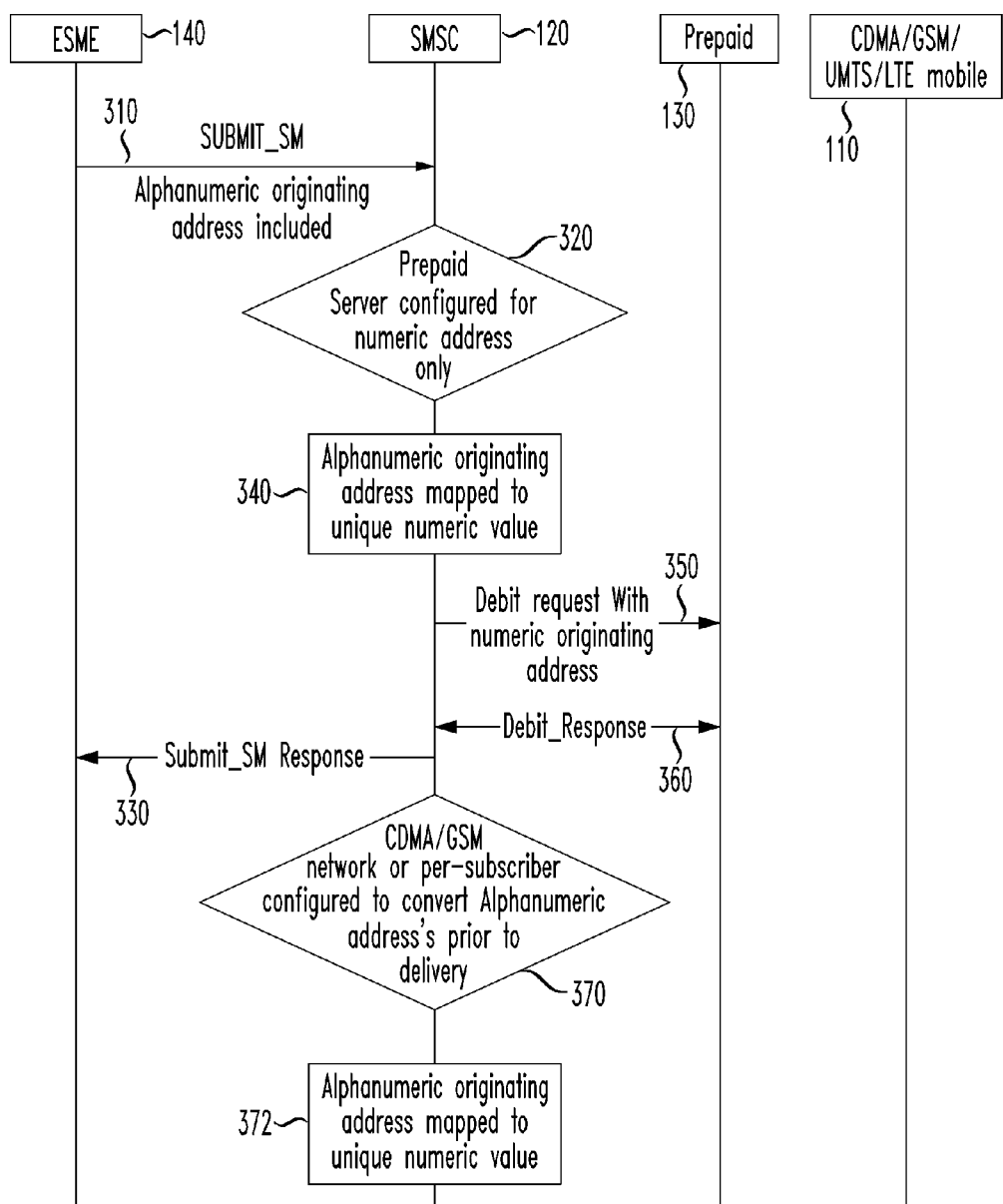
FIG. 1 shows call flow from an alphanumeric addressing external short message entity (ESME) to a numeric addressing mobile device, for non-homogeneous short message networks, in accordance with the principles of the present invention.
Figure 1:
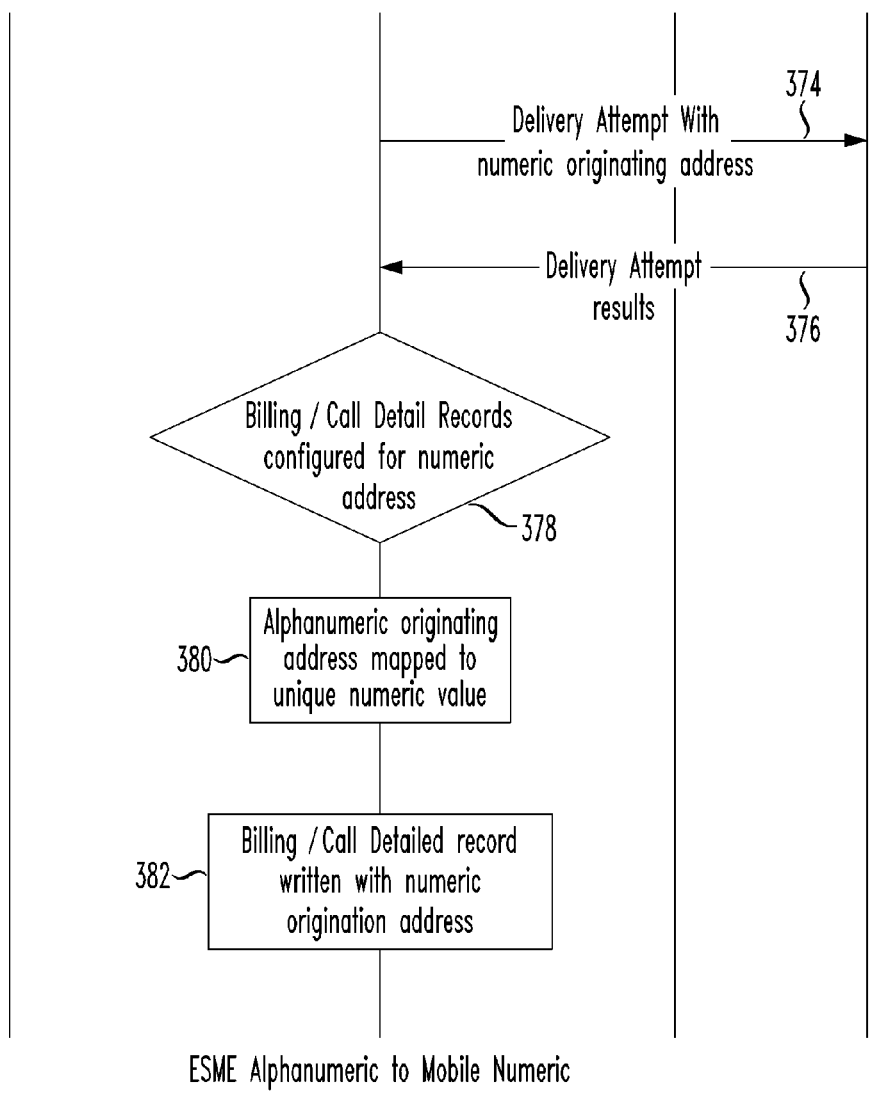

The present invention delivers text messages with alphanumeric addresses to mobile devices and external short message entities (ESMEs) which do not support alphanumeric addressing, and provides meaningful fallback handling.

Additionally, the invention enables delivery of Short Message Peer to Peer (SMPP) messages from ESMEs or SMPP networks which can only originate numeric addresses, yet provide for mapping to alphanumeric addresses for delivery to a destination wireless mobile device.

The present invention adapts technology which is available within various telecommunication standards, but under-used due to the challenges of interoperability in heterogeneous networks. The inventive solution provides a two-way mapping between alphanumeric addresses and short message system (SMS) short-codes to enable delivery of text messages with alphanumeric addressing in networks which contain mobiles and/or ESME's that lack support of alphanumeric addressing.

In accordance with the invention, an ESME can send a text message using an alphanumeric origination address, without the need to know which handsets support the capability, and which do not, or whether handsets are on CDMA, or GSM, or UMTS, or long term evolution (LTE) networks, or can continue to send using a numeric origination address. The Short Message Servicing Center (SMSC) provides conversions to alphanumeric addresses on behalf of the ESME and mobile device.

This supports mapping of source and originating addresses both from and to numeric addresses, and mapping of numeric source addresses to alphanumeric for ESME_>Mobile Terminated call flows.

The configuration of the mapping is preferably accomplished such that the number is a meaningful representation of the alphanumeric address. For example, if ABXCorp's short-code address is "12345", messages with an originating address of "ABXCorp" will fall back to "12345". In this manner, response messages addressed to either "ABXCorp" or "12345" are routed to the same destination ESME.

As an extension, or alternate to, the static mapping approach, ESMEs may also include a custom Tag Length Value (TLV) component of an SMPP message to provide an alternate origination address. This allows ESMEs to provide address information in a dynamic fashion, without need for provisioning of a translation table at the SMSC, and still overcomes cases where the infrastructure between the ESME and the SMSC does not support use of alphanumeric addresses directly.

Messages which fail to be delivered due to protocol errors, system or interface configuration, preferably trigger the SMSC 120 to convert the alphanumeric origination address to a meaningful numeric origination address.

In addition to per-message support, entire air-interfaces may be configured to convert alphanumeric addresses back to numeric.

For ESMEs connected to a specific port, the connection may be configured to convert addresses to numbers when alphanumeric addresses are not supported. ESMEs can also be configured by system-type to identify those which cannot support alphanumeric addressing. Or by alphanumeric name (e.g., messages to "ABXCorp" always get converted to "12345").

The present invention provides focus on four primary call flows shown in FIGS. 1 through 4.

FIG. 1 shows call flow from an alphanumeric addressing external short message entity (ESME) to a numeric addressing mobile device, for non-homogeneous short message networks, in accordance with the principles of the present invention.

In particular, as shown in the call flow of FIG. 1, a message originates from an external short message entity (ESME) with an alphanumeric originating address, and terminates to a mobile device where the ESME does not support alphanumeric addressing. These may be addressed in two ways, shown in FIG. 1 and FIG. 2.

With respect to FIG. 1, the air interface (such as CDMA) may be configured not to support alphanumeric addressing. This causes the message's alphanumeric origination address to be mapped to a digit string, prior to the first attempt. The second technique (shown in FIG. 2) permits the message to fail delivery based on a failure response (such as protocol error), at which time, the SMSC then maps the alphanumeric origination address to a number and retries delivery of the message.

As shown in FIG. 1, an exemplary call flow is described between an originating mobile device 110 (e.g., a CDMA/GSM/UMTS/LTE mobile), a short message service center (SMSC) 120, a prepaid server 130, and a receiving external short message entity (ESME) 140.

The ESME 140 sends a Submit_SM message 310 including alphanumeric originating address to the SMSC 120.

As depicted in module 320, the prepaid server 130 is configured for numeric addressing only.

In step 340, an alphanumeric originating address is mapped to a unique numeric value. The SMSC 120 sends a Debit request message 350 with numeric originating address to the prepaid server 130.

The prepaid server 130 sends a Debit Response message 360 back to the SMSC 120, which sends a Submit_SM Response message 330 to the ESME 140.

In step 370 the CDMA or GSM network, or per-subscriber, is configured to convert alphanumeric addresses prior to delivery.

The alphanumeric originating address is mapped to a unique numeric value in step 372.

The SMSC 120 sends a Delivery Attempt message with numeric originating address 374 to the CDMA or GSM or IMS or LTE mobile device 110, which sends back a Delivery Attempt message 376 with results.

In step 378, the SMSC 120 configures the billing/call detail records for a numeric address.

In step 380, the alphanumeric originating address is mapped to a unique numeric value.

In step 382, the billing/call detailed record is written with a numeric origination address.

Figure 2:
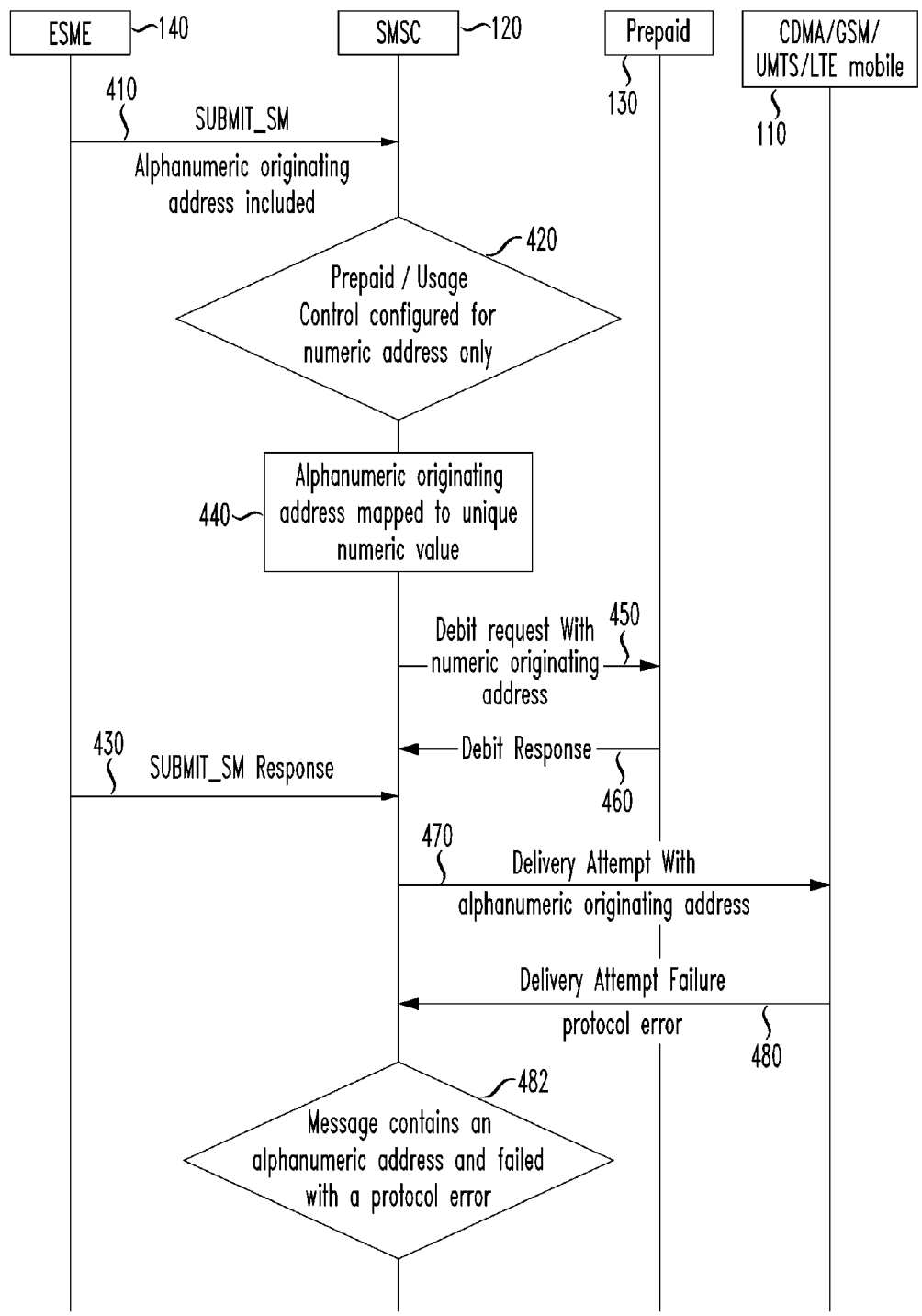
FIG. 2 shows another exemplary call flow from an alphanumeric addressing external short message entity (ESME) to a numeric addressing mobile device, for non-homogeneous short message networks, in accordance with the principles of the present invention.
Figure 2:
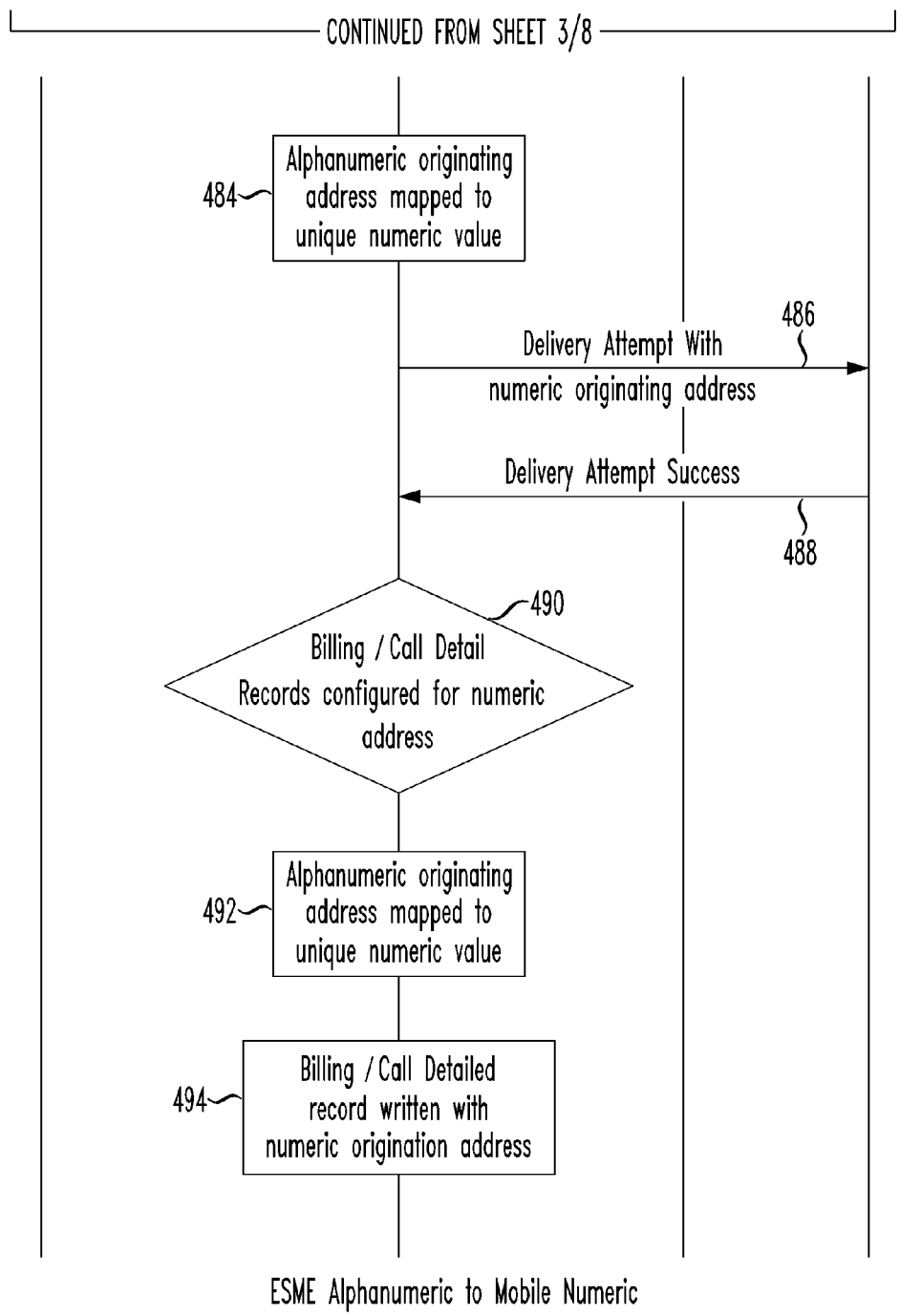

FIG. 2 shows another exemplary call flow from an alphanumeric addressing external short message entity (ESME) to a numeric addressing mobile device, for non-homogeneous short message networks, in accordance with the principles of the present invention.

In particular, as shown in FIG. 2, the ESME 140 sends a Submit_SM message 410 including alphanumeric originating address to the SMSC 120.

As depicted in module 420, the prepaid server 130 is configured for numeric addressing only.

In step 440, an alphanumeric originating address is mapped to a unique numeric value. The SMSC 120 sends a Debit request message 450 with numeric originating address to the prepaid server 130.

The prepaid server 130 sends a Debit Response message 460 back to the SMSC 120, which sends a Submit_SM Response message 430 to the ESME 140.

The SMSC 120 sends a Delivery Attempt with alphanumeric originating address to the mobile device 110 (e.g., a CDMA, GSM, IMS or LTE mobile device).

In response, a Delivery Attempt Failure message 480 with protocol error is sent from the mobile device 110 back to the SMSC 120.

In step 482, it is determined that the message containing an alphanumeric address failed with a protocol error.

In step 484 the alphanumeric originating address is mapped to a unique numeric value.

A Delivery Attempt message 486 with numeric originating address is sent to the mobile device 110, which sends back a Delivery Attempt Success message 488.

In step 490, billing/call detail records are configured for numeric address.

In step 492, the alphanumeric originating address is mapped to a unique numeric value.

In step 494, the billing/call detailed record is written with a numeric origination address.

Figure 3:
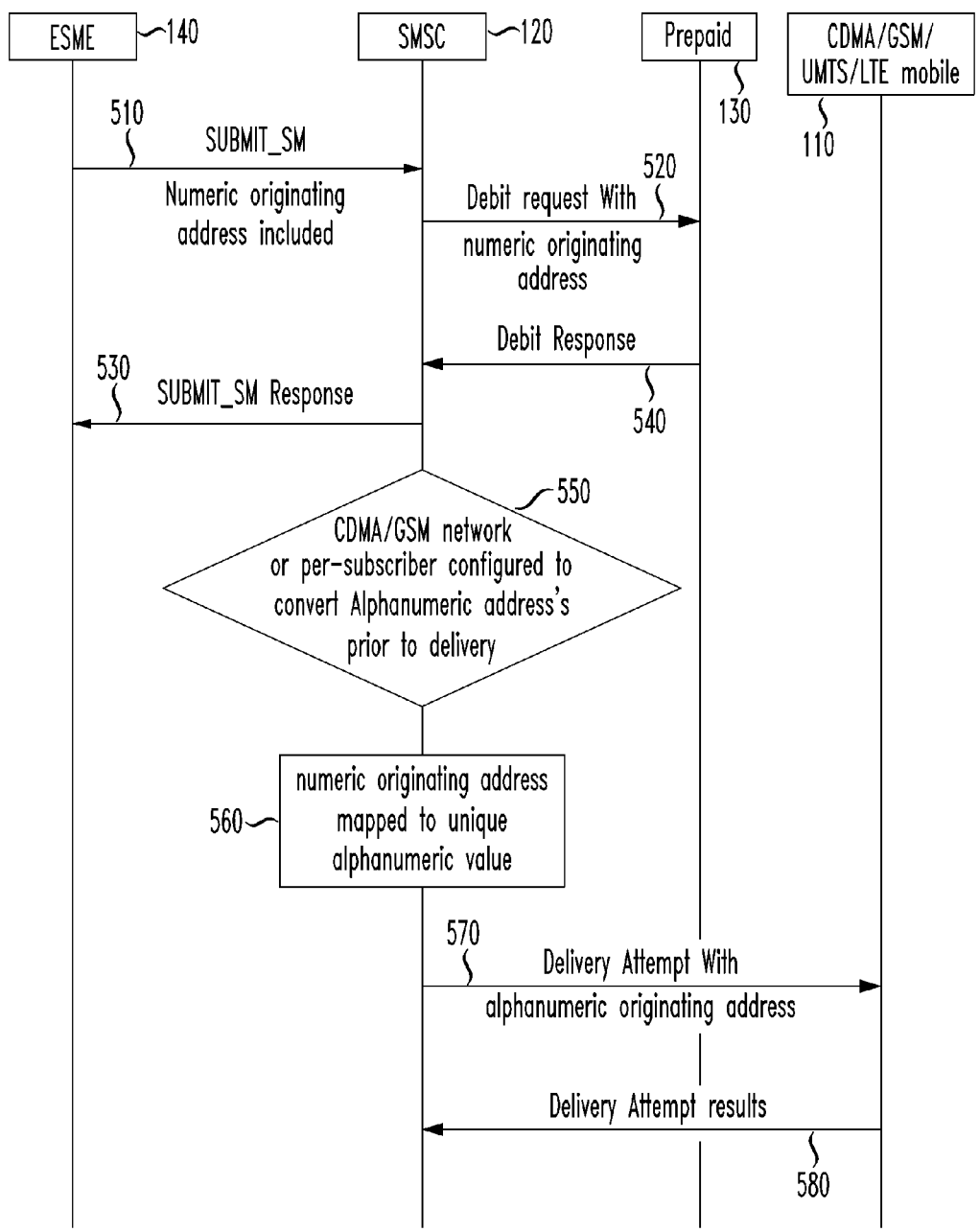
FIG. 3 shows call flow from a numeric addressing external short message entity (ESME) to an alphanumeric addressing mobile device, for non-homogeneous short message networks, in accordance with the principles of the present invention.
Figure 3:
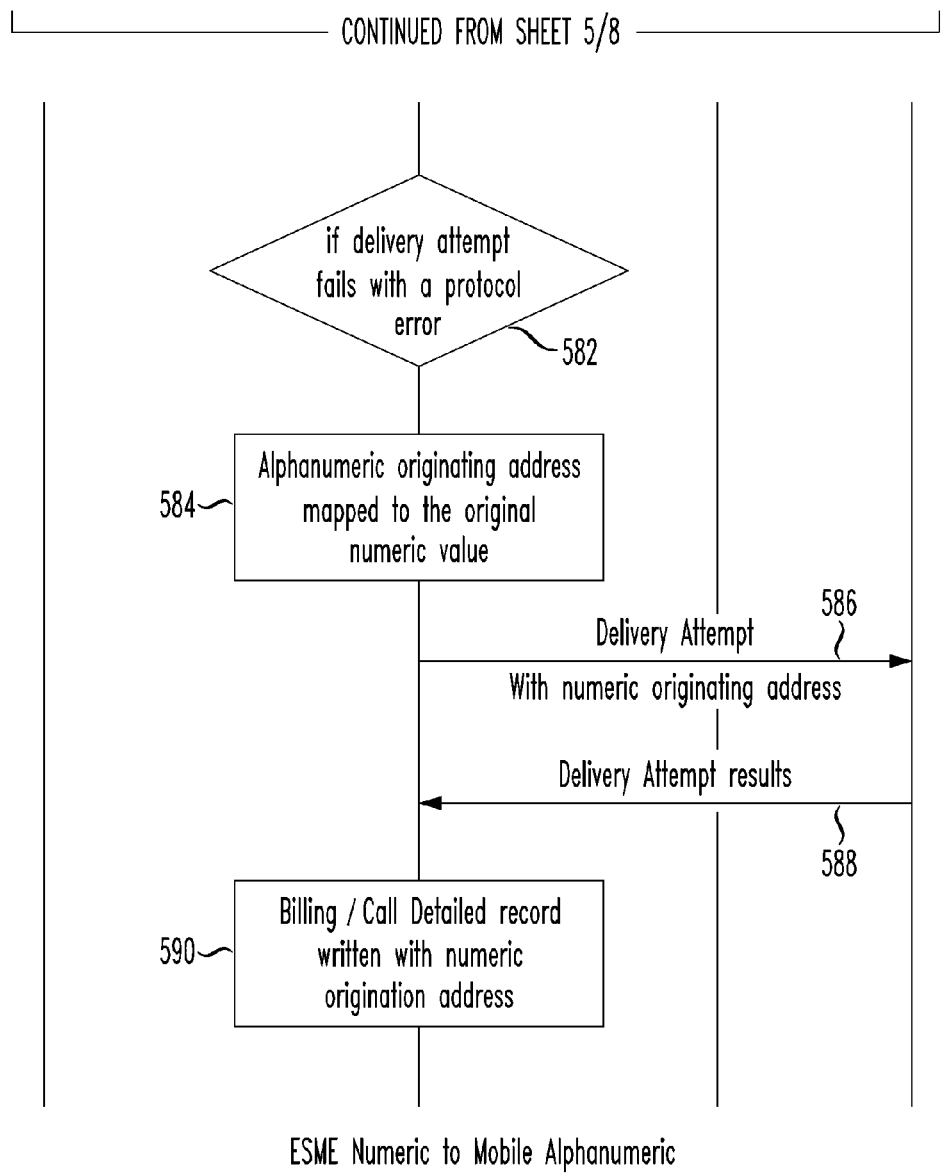

FIG. 3 shows call flow from a numeric addressing external short message entity (ESME) to an alphanumeric addressing mobile device, for non-homogeneous short message networks, in accordance with the principles of the present invention.

In particular, in the call flow of FIG. 3, a message originates from an ESME terminating to a mobile device where the ESME sends a numeric address (but would prefer an alphanumeric address be used where possible). This call flow encompasses messages originating from an ESME with numeric originating addresses, and terminating to a mobile which may support alphanumeric addressing (based on per-interface or per subscriber rules). This causes the message's numeric origination address to be mapped to an alphanumeric string, prior to the first attempt. Should an attempt fail, due to protocol error, the fallback mapping occurs as with respect to the call flow of FIGS. 1 and 2.

As shown in FIG. 3, the ESME 140 sends a Submit_SM message 510 including a numeric originating address to the SMSC 120.

The SMSC 120 sends a Debit Request message 520 with numeric originating address to the prepaid server 130, which sends a Debit Response message 540 back to the SMSC 120.

The SMSC 120 sends a Submit_SM Response message 530 to the ESME 140.

In step 550, the LTE, CDMA, UMTS, or GSM network, or per-subscriber, is configured to convert alphanumeric addresses prior to delivery.

In step 560 the numeric originating address is mapped to a unique alphanumeric value.

The SMSC 120 sends a Delivery Attempt with alphanumeric originating address message 570 to the mobile device 110 (e.g., a CDMA, GSM, UMTS or LTE mobile device).

In response, a Delivery Attempt results message 580 is sent from the mobile device 110 back to the SMSC 120.

In step 582, it is determined that the delivery attempt failed with a protocol error.

In step 584 the alphanumeric originating address is mapped back to the original numeric value.

A Delivery Attempt message 586 with numeric originating address is sent to the mobile device 110, which sends back a Delivery Attempt results message 588.

In step 590, the billing/call detail records are written with a numeric origination address.

Figure 4:
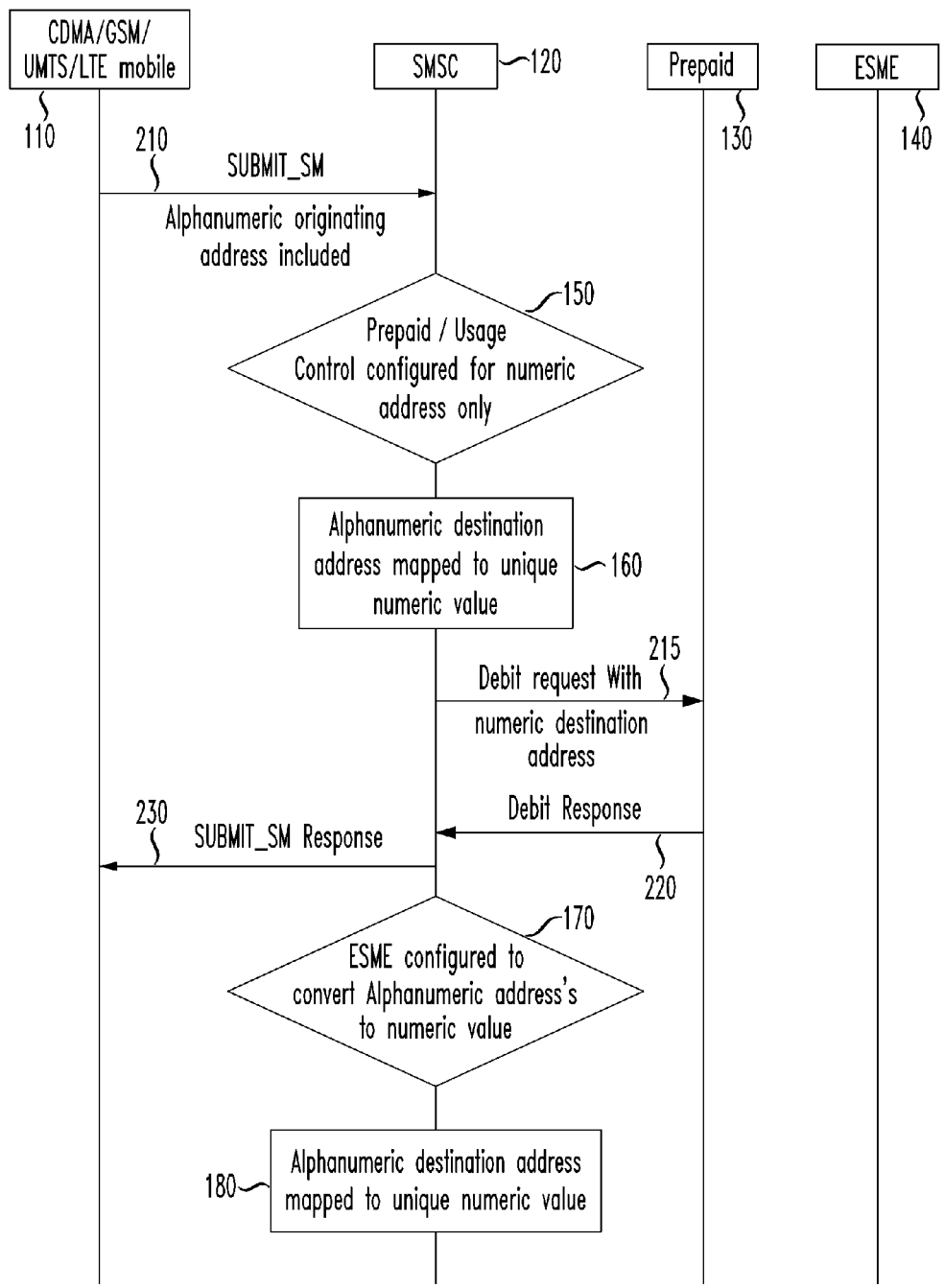
FIG. 4 shows call flow from an alphanumeric addressing mobile device to a numeric addressing external short message entity (ESME), for non-homogeneous short message networks, in accordance with the principles of the present invention.
Figure 4:
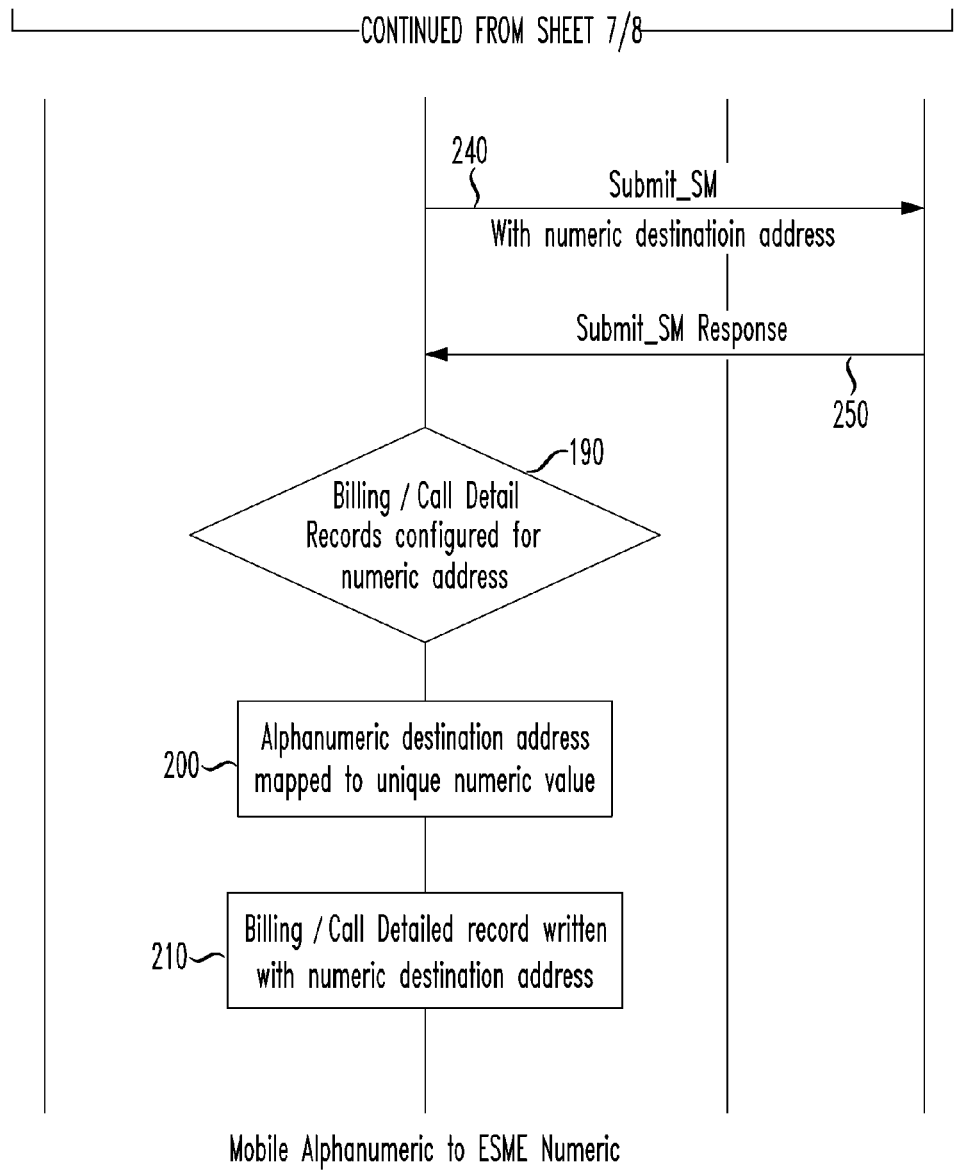

FIG. 4 shows call flow from an alphanumeric addressing mobile device to a numeric addressing external short message entity (ESME), for non-homogeneous short message networks, in accordance with the principles of the present invention.

In particular, in the call flow of FIG. 4, a message originates from a mobile device with an alphanumeric destination address, and terminates to an ESME that does not support alphanumeric addressing. In this case, based on ESME configuration provisioning, the SMSC converts the alphanumeric destination address to a digit address and sends the text message to the ESME. Since ESMEs are relatively static, the requirement to convert is normally accomplished through configuration. While the invention encompasses a possible attempt followed by a retry, this is inefficient for the mobile originated (MO) to ESME case.

As shown in FIG. 4, the short message service center 120 receives a Submit_SM type message 210 from the originating mobile device 110, including an alphanumeric destination address.

A prepaid/usage control module 150 in the SMSC 120 receives the Submit_SM message 210, and the prepaid/usage control module 150 is configured for numeric address only.

In step 160, the alphanumeric destination address is mapped to a unique numeric value 160 within an appropriate module at the SMSC 120.

In message 215, a Debit request with numeric destination address is sent from the SMSC 120 to a prepaid module 130. The prepaid module 130 returns a Debit Response to the SMSC 120, and a Submit_SM Response is passed from the SMSC 120 to the originating mobile device 110.

In step 170, the SMSC 120 determines that the ESME 140 is configured to accept numeric values only, so there is a need to convert alphanumeric addresses to numeric value.

In step 180 an alphanumeric destination address is mapped to a unique numeric value.

In message 240 a Submit_SM with numeric destination address is sent from the SMSC 120 to the external short message entity (ESME) 140.

In message 250 the ESME 140 sends a Submit_SM with response back to the SMSC 120.

In step 190 the billing/call detail records configured for numeric address.

In step 200 the alphanumeric destination address is mapped to a unique numeric value.

In step 210 the billing/call detailed record written with numeric destination address.

There are numerous extensions envisioned within the scope of the principles of the present invention. For instance:

Tracking and retaining the handsets capabilities for a period of time. In this way, if an alphanumeric fails, subsequent messages are automatically converted, prior to the first attempt.

Configuring per-subscriber exceptions to the per-air-interface rules. This accommodates gradual adoption of handsets—particularly in the CDMA environment which supports IA5 encoding.

The present invention provides an SMSC module that provides a bridge between systems which have the capability to support addressing between wireless devices that may or may not be capable of dealing with alphanumeric addresses.

The present invention permits ESMEs to support a branded source to clearly identify the originator, e.g., a message from "ABXCorp" or a message from "12345"—Many vendors much prefer to put their brand name in front of a customer, rather than a short code.

The present invention has particular applicability to wireless carrier markets, e.g., to carriers having mixed LTE/CDMA or GSM/CDMA or UMTS/CDMA networks. The invention may be implemented in an SMSC that supports dual networks (e.g., CDMA network+LTE or GSM) where handsets receive text messages from ESMEs that show an originating alphanumeric address.

While prepaid debit is shown with respect to the embodiments of the present invention, the invention applies equally to post-paid embodiments.

While the invention has been described with reference to the exemplary embodiments thereof, those skilled in the art will be able to make various modifications to the described embodiments of the invention without departing from the true spirit and scope of the invention.

What is claimed is:

1. A method of providing two-way alphanumeric address mapping for a non-homogeneous short message network, comprising:
   receiving a text message including an alphanumeric origination address including at least one non-numeric character identifying a terminating external short message entity (ESME), said alphanumeric origination address including at least one non-numeric character;
   mapping, prior to a first attempt to deliver said text message to said terminating mobile device, said alphanumeric origination address including said at least one non-numeric character identifying said unique origination source, to a numeric digit-only short code associated with said terminating mobile device;
   routing said text message with said numeric digit-only short code addressing to said terminating mobile device;
   receiving a return text message including a numeric digit-only short code address from said ESME;
   mapping said numeric digit-only short code address of said return text message to an alphanumeric destination address including at least one non-numeric character corresponding to said terminating mobile device; and
   routing said return text message to said terminating mobile device.

2. The method of providing two-way alphanumeric address mapping for a non-homogeneous short message network according to claim 1, further comprising:
   configuring an air interface to said terminating mobile device not to support alphanumeric addressing, causing said text message's alphanumeric origination address to be mapped to said numeric digit-only short code prior to said first attempt to deliver said text message to said terminating mobile device.

3. The method of providing two-way alphanumeric address mapping for a non-homogeneous short message network according to claim 1, whereby:
   said ESME is configured to send a text message using an alphanumeric origination address, irrespective of a capability of said terminating mobile device to support alphanumeric addressing, and irrespective of a network type of said terminating mobile device.

4. The method of providing two-way alphanumeric address mapping for a non-homogeneous short message network according to claim 3, further comprising:
   configuring an air interface to said terminating mobile device not to support alphanumeric addressing, causing said text message's alphanumeric origination address including at least one non-numeric character to be mapped to said numeric digit-only short code address prior to said first attempt to deliver said text message to said terminating mobile device.

5. A method of providing two-way alphanumeric address mapping for a non-homogeneous short message network, comprising:
   receiving a text message including an alphanumeric origination address including at least one non-numeric character identifying a terminating external short message entity (ESME), said alphanumeric origination address including at least one non-numeric character;
   routing said text message to said terminating mobile device with said alphanumeric origination address including at least one non-numeric character;
   receiving a failed delivery message relating to failure of delivery of said text message;
   mapping said alphanumeric origination address including at least one non-numeric character identifying said unique origination source, to a numeric digit-only short code string identifying said ESME; and
   routing said text message with said numeric digit-only short code string addressing to said terminating mobile device.

6. The method of providing two-way alphanumeric address mapping for a non-homogeneous short message network according to claim 5, whereby:
   said ESME is configured to send a text message using an alphanumeric origination address, irrespective of a capability of said terminating mobile device to support alphanumeric addressing, and irrespective of a network type of said terminating mobile device.

7. A method of providing two-way alphanumeric address mapping for a non-homogeneous short message network, comprising:
   receiving, from a mobile device, a text message including an alphanumeric destination address including at least one non-numeric character identifying a terminating external short message entity (ESME);
   mapping said alphanumeric destination address including at least one non-numeric character to a numeric digit-only short code address;
   routing said text message with said numeric digit-only short code address to said terminating external short message entity (ESME);
   receiving a return text message including a numeric digit-only short code address from said ESME;
   mapping said numeric digit-only short code address of said return text message to an alphanumeric destination address including at least one non-numeric character corresponding to said mobile device; and routing said return text message to said mobile device.

8. The method of providing two-way alphanumeric address mapping for a non-homogeneous short message network according to claim 7, wherein:

a Short Message Servicing Center (SMSC) provides conversions of numeric-only addresses to alphanumeric addresses including alpha characters on behalf of said terminating external short message entity (ESME).

* * * * *